J. E. Kenderdine,
Reciprocating Saw Mill.
N° 2,997.   Patented Mar. 10, 1843.
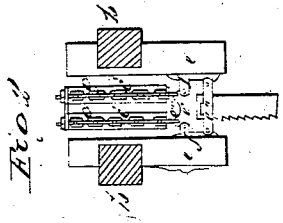
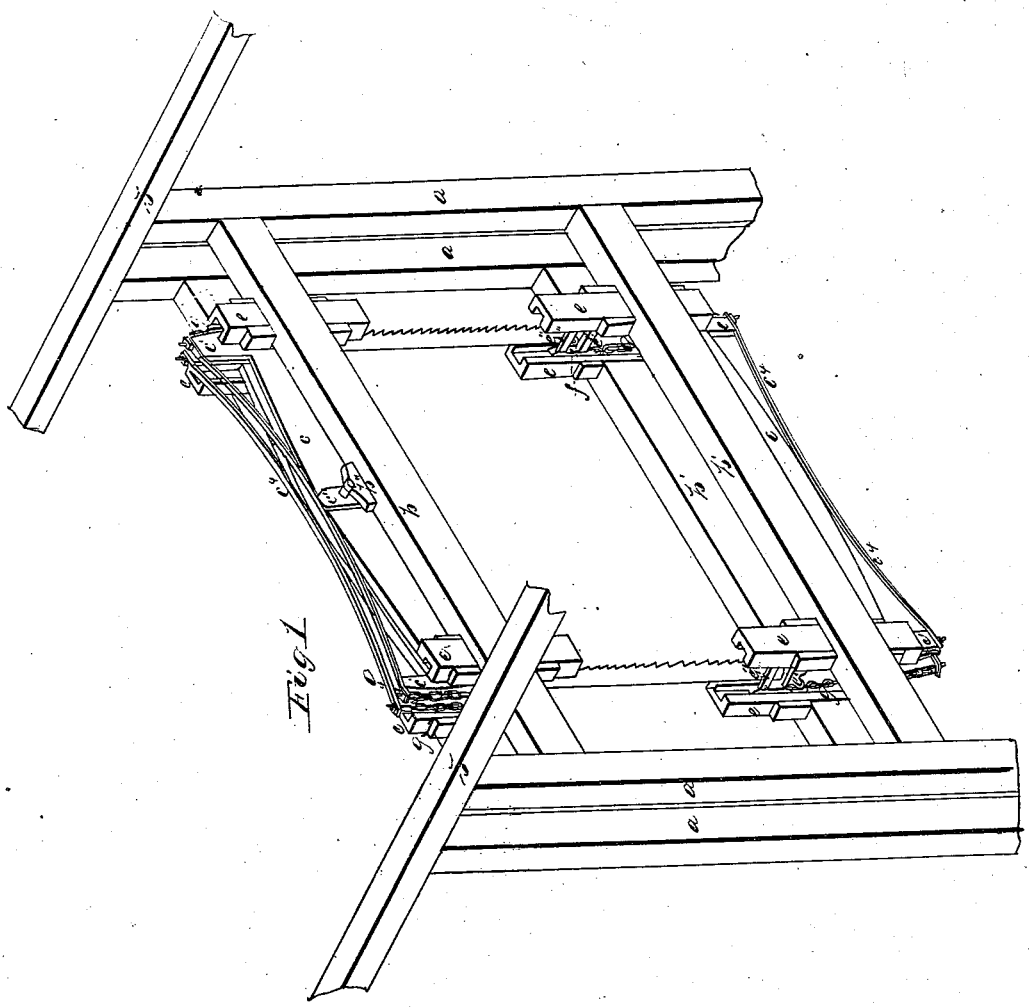

UNITED STATES PATENT OFFICE.

JOHN E. KENDERDINE, OF LUMBERTON, PENNSYLVANIA.

SAWMILL.

Specification of Letters Patent No. 2,997, dated March 10, 1843.

*To all whom it may concern:*

Be it known that I, JOHN E. KENDERDINE, of Lumberton, in the county of Bucks and State of Pennsylvania, have invented a new and useful Improvement in Sawmills; and I do hereby declare that the following is a full, clear, and exact description thereof, reference being had to the accompanying drawings, making a part of this specification, in which—

Figure 1, is a perspective view; Fig. 2 stirrup-slide and arch head of beam detached.

The nature of my invention consists in the manner of affixing the saws to the ends of the vibrating beams, and properly straining them.

The construction of this machine is similar in most of its parts to saw mills now in common use for sawing two logs at the same time except those connected with hanging the saws. I employ two fender parts (marked ($a$) in the drawing) on each side. These are connected in pairs at top by cross ties ($b$) and below the carriage (which is not represented). There are two other ties ($b'$); the upper ones sustain two steps ($b''$) (one being hid by the beam) on which the fulcrum of a double-vibrating beam, oscillates. The vibrating-beam ($c$) is formed of two planks set edgewise. They are gradually tapered off from the center toward each end, and are made stout enough to resist the strain to which they are submitted. This beam is placed horizontally and vibrates between the two cross ties ($b$). On each end of both of the planks forming the double beam upright pieces ($c'$) are affixed, the outer edge of which is curved to form arch-heads, on which chains work as hereafter described; at the center the planks are connected by an iron ($c''$) which passes across from one to the other underneath and bends up at each end at right angles outside the planks, allowing both halves of the beam a motion independent of each other. The fulcrum pins are connected with this iron ($c''$); the beam is further stayed by cross irons ($c'''$) and rods ($c^4$) running from the top of one arch-head to the center, at which it is fastened and then up to the opposite arch-head. The lower double beam is like that just described in every particular except being reversed in position; to this the motive power is attached by a pitman connected with it at one end.

Opposite the ends of the beams, there are vertical pieces ($e$) attached to each of the cross ties ($b$, $b'$); they are grooved on their inner side, and serve as guides to the stirrup-slides, to which the saws are connected. Each of the stirrup-slides consists of two side pieces ($f$) which slide in the grooves ($e$). On these are two projections above and one below. Between the upper ones the end of a cross piece ($e'$) is jointed which connects the sides; below there are two cross pieces ($e''$). To the upper one the chains ($g$) are hitched which extend up over the curve of the arch-head of the beam which have a groove in them to receive the links of the chains. The saw passes up between the two lower plates ($e''$) and has two keys put through it. The chains are affixed to the beams by a hook the shank of which runs up through a staple at the upper end of the cross head and has a screw on it to adjust the strain on the saw.

By the above arrangement the saws are attached to the upper and lower double beam, one at each end, and can be strained in the most exact manner, a greater strain being given to either edge of the saw at pleasure.

What I claim as my invention and desire to secure by Letters Patent is—

The combination of the double beams, stirrup-slides, and double-chains constructed and arranged in the manner and for the purpose above specified.

JOHN E. KENDERDINE.

Witnesses:
LUKENS THOMAS,
CHALKLEY GOOD.